United States Patent [19]

Kallenberger

[11] Patent Number: 5,320,431
[45] Date of Patent: Jun. 14, 1994

[54] LUBRICATION GROOVE ARRANGEMENT FOR A JOURNAL BEARING

[75] Inventor: Harvey J. Kallenberger, Wind Lake, Wis.

[73] Assignee: Harnischfeger Corporation, Milwaukee, Wis.

[21] Appl. No.: 113,914

[22] Filed: Aug. 30, 1993

Related U.S. Application Data

[63] Continuation of Ser. No. 921,914, Jul. 29, 1992, abandoned.

[51] Int. Cl.$^5$ ............................................. F16C 17/02
[52] U.S. Cl. ..................................... 384/322; 384/373
[58] Field of Search ............... 384/292, 291, 369, 373, 384/393, 118

[56] References Cited

U.S. PATENT DOCUMENTS

| | | | |
|---|---|---|---|
| 2,479,349 | 8/1949 | Hagg | 384/292 |
| 2,901,297 | 8/1959 | Sternlicht | 384/291 |
| 3,965,880 | 6/1976 | Michael | 384/292 |

Primary Examiner—Lenard A. Footland
Attorney, Agent, or Firm—Jansson & Shupe, Ltd.

[57] ABSTRACT

The invention is an improvement in a machine having a bushing-type journal bearing and a bearing-supported component relatively rotatable one to the other. The bearing has a surface contacting the component and at least one lubrication groove formed in such surface. The improvement comprises a plurality of lubrication grooves spaced along the surface and defining first and second groove sets. Each groove in at least the first set (and preferably in both sets) includes a segment angular to the direction of rotation so that lubricant is distributed both circumferentially and axially on the surface. Groove exit runners are provided so that grease is urged outward toward the bearing edges. The highly preferred embodiment is suitable for uni-directional or bi-directional rotation and other embodiments are disclosed which can be used for uni-directional rotation.

2 Claims, 11 Drawing Sheets

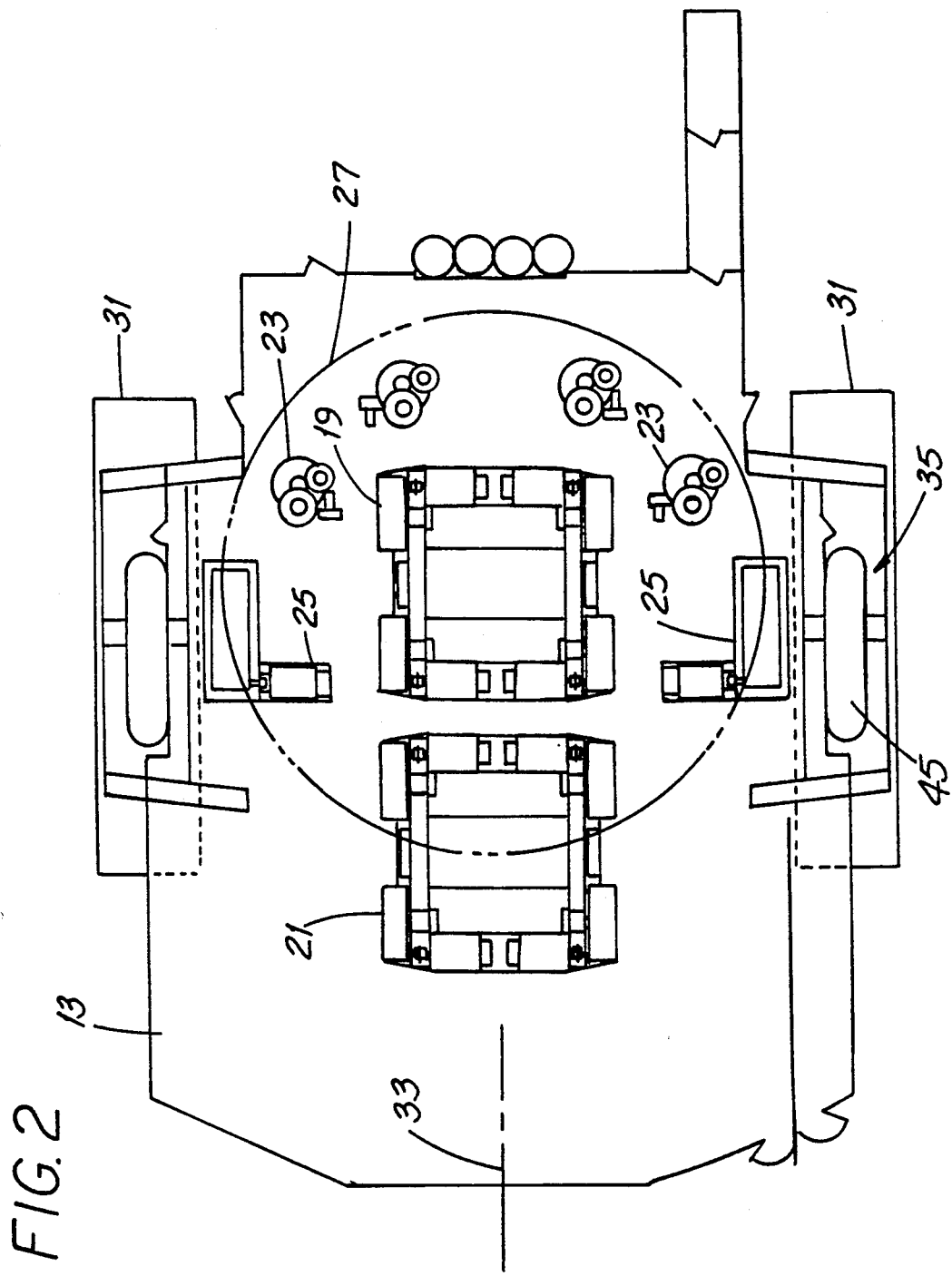

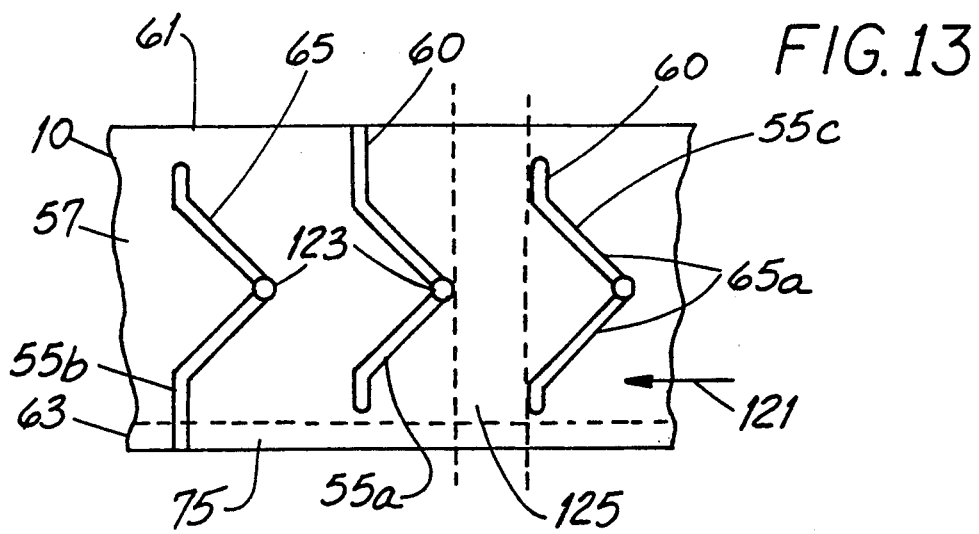
FIG. 13
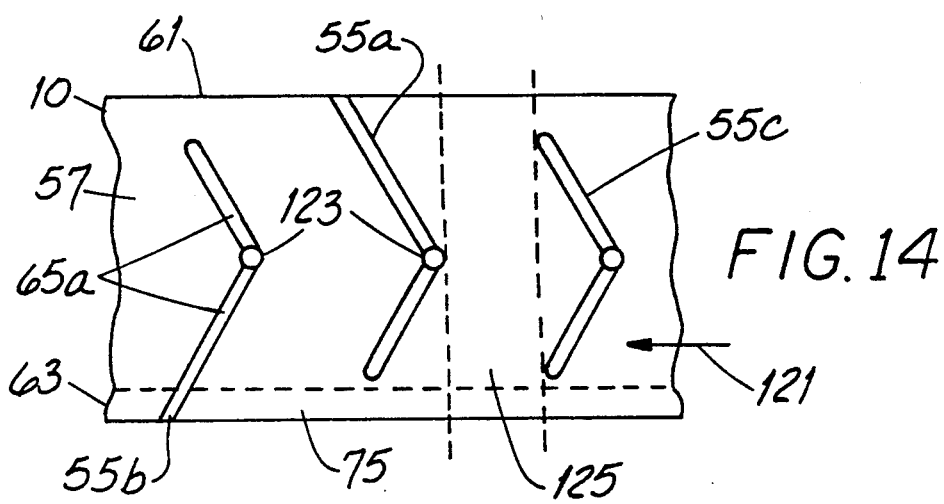
FIG. 14
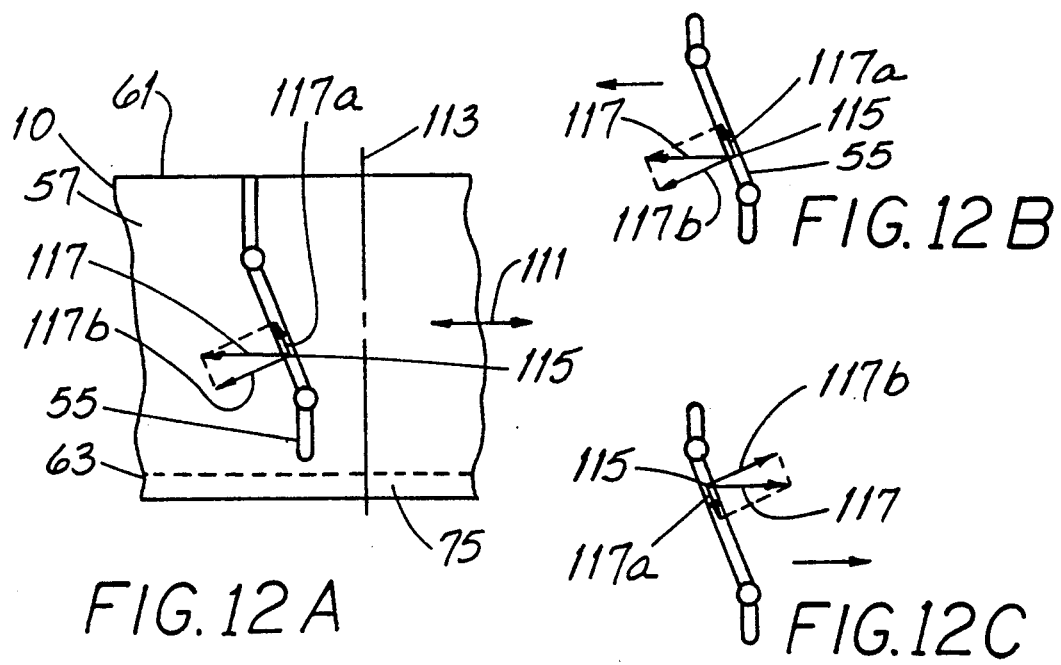
FIG. 12A
FIG. 12B
FIG. 12C

LUBRICATION GROOVE ARRANGEMENT FOR A JOURNAL BEARING

RELATED APPLICATIONS

This application is a continuation of application Ser. No. 07/921,914 filed on Jul. 29, 1992 and now abandoned.

FIELD OF THE INVENTION

This invention relates generally to machine components and, more particularly, to components relatively rotatable one to the other.

BACKGROUND OF THE INVENTION

Friction-reducing devices called bearings are available in a wide variety of types and are used in machines of virtually all sizes and complexities. A well-known type uses component parts which roll relative to other parts. For example, bicycle hubs use ball bearings, with or without a bearing "race." And every electrically powered home appliance uses one or more bearings. To enlarge the scale of the examples, railroad freight car wheels are supported on tapered roller bearings. Bearings of the foregoing types incorporate a multiplicity of rolling components such as spherical balls, solid cylindrical rollers, slender cylindrical needles or solid tapered rollers.

Such bearings share certain common features. One is that they operate at relatively high speed. Another is that they are known as "hydrodynamically" lubricated bearings in that their operating speed helps assure that critical surfaces are continually coated with a film of lubricant.

However, bearings having rolling components are by no means the only type of bearing used. Another major bearing type is known as a "bushing" or bushing-type bearing, sometimes called a plain journal bearing. In simplest form, bushing-type bearings are hollow cylinders supporting a component such as a shaft. Bearings of the bushing type involve sliding rather than rolling motion and are typically used where relative bearing-component rotation is at a rather slow speed.

Bearings of this type are known as "boundary" lubricated bearings in that there may not be a film of lubricant between the bearing and the adjacent component. Because such bearings support significant loads (for their size) and because, often, the bearing is called upon to function only occasionally, e.g., once or twice a day, lubricant is simply squeezed out from between the relatively moving surfaces.

With larger machines, bearing lubrication—especially in plain journal or bushing bearings—can be a difficult design problem. Nowhere is this more true than in large mobile machines such as earth-moving and earth-excavating machinery.

Such machinery is available in a wide variety of types ranging from the familiar rubber-tire mounted and crawler-mounted to the less-common dragline. A dragline is often used for removing top soil and "overburden" to expose a valuable mineral, e.g., coal, beneath but near the earth's surface.

A dragline is equipped with an angularly-extending boom from which is suspended a "bucket" having an open mouth and digging teeth, both facing toward the main portion of the machine. Overburden is removed by placing the bucket on the ground at a point distant from the machine and pulling it toward the machine, filling the bucket in the process. Once filled, the machine pivots about a central axis and the bucket emptied at a spoil pile somewhat away from the area being excavated.

Smaller draglines are crawler mounted (much like a military tank) and capable of movement in the same way, albeit at much slower speeds. However, as draglines (and their digging buckets) increased in size, crawler mounting was found to be impractical and in the early 1900's, the "walking" dragline was developed. The walking dragline is so named because it takes short "steps" and uses a "walk leg" mechanism (which resembles a human leg) to do so. A difference is that in a walking dragline, both legs step simultaneously.

To give some perspective to the following discussion, a large walking dragline—made by Harnischfeger Industries of Milwaukee, Wis., and incorporating the invention—has a main housing portion (including the machinery deck, operator's cab and the like) which is about 105 feet long, about 80 feet wide, about 40 feet high and weighs about nine million pounds. The boom extends about 300 feet and the capacity of the digging bucket is about 80 cubic yards. The walk legs of such dragline take steps about seven feet in length.

In a specific application in which the inventive groove arrangement is used, one embodiment of the bushing-type bearing described below is about nine feet in diameter and in excess of two feet in cylindrical length. An adult can easily stand upright inside the "ring" formed by the bushing! The walk legs of a walking dragline preferably use a bushing-type bearing since they are heavily loaded, the leg operates at very slow speed and may be called upon to "walk" only once or a few times per day.

An earlier bearing lubrication groove arrangement involved one or two continuously-cut grooves formed on the interior cylindrical surface of the bearing. This earlier arrangement is aptly described as resembling opposed sine waves since the paths defined by the grooves closely resemble the "trace" of two alternating voltages which are 180° out of phase.

A problem with this earlier lubrication groove arrangement is that there are significant portions of the bearing surface which are not effectively lubricated and therefore, are subject to inordinate wear. Another problem is that the sine wave grooves do not satisfactorily "flush" out small wear particles nor do they provide for bearing edge lubrication.

Another earlier arrangement involved a number of individual grooves formed in the bearing surface in an axial direction, i.e., parallel to the cylinder central axis of the bearing. For reasons explained below, such axially-oriented grooves do not satisfactorily distribute grease in an axial direction. As a result, some areas of the bearing surface are "starved" of grease.

The invention is directed to an improved lubrication groove arrangement which helps maintain a film of lubricant in boundary lubricated bearings. As will become apparent, the invention resolves some of these difficulties in unique and imaginative ways.

OBJECTS OF THE INVENTION

It is an object of the invention to provide an improved lubrication groove arrangement overcoming some of the problems and shortcomings of the prior art.

Another object of the invention is to provide an improved lubrication groove arrangement for a bushing-type journal bearing.

Yet another object of the invention is to provide an improved lubrication groove arrangement which distributes lubricant both circumferentially and axially.

Still another object of the invention is to provide an improved lubrication groove arrangement which helps flush wear particles away from the bearing surface.

Another object of the invention is to provide an improved lubrication groove arrangement which, in various embodiments, is suitable for use in bi-directional and uni-directional applications.

Yet another object of the invention is provide an improved walk leg mechanism for a walking dragline.

How these and other objects are accomplished will become apparent from the following descriptions and the drawing.

SUMMARY OF THE INVENTION

Briefly stated, the invention involves a plurality of separate grooves formed in the surface of a bushing-type bearing. As to certain versions of the inventive groove arrangement, some of the grooves may be in "end-for-end" orientation with respect to other grooves. Therefore, in the descriptions, grooves are identified as being in "sets" and a set may include one or more grooves.

It should also be appreciated that the inventive groove arrangement involves groove "segments" which are oriented on the bearing surface angular to the direction of rotation of the component which bears against and is supported by the bearing. That is, a segment is neither coincident with the circumferential direction of rotation nor parallel to the cylinder central axis of the bearing. Since such segments are cut into a surface which is itself curved, the segments are necessarily curved. However, when viewed in a depiction which "lays out" the bearing on a flat surface, such segments are linear in that they are coincident with a particular plane. The phrase "generally linear" refers to a segment fitting the foregoing description.

In the summarization and detailed description, reference is also made to "axial region." An axial region is a region extending between bearing edges and which has a width as measured along the circumferential surface. This "length × width area," as further described below, is an axial region.

Unless otherwise indicated in the following descriptions, the term "bearing" means a bushing-type plain journal bearing. The invention is an improvement in a machine having a highly-loaded bearing and a bearing-supported component such as a shaft or shaft-like component. The bearing and the component are relatively rotatable one to the other at low speed. The bearing includes a surface, e.g., its interior cylindrical surface, contacting the component and having at least one lubrication groove formed in the surface.

The improvement comprises a plurality of lubrication grooves spaced along the surface and in one embodiment, the plurality of grooves includes at least one groove connected to a first exit runner and at least another groove connected to a second exit runner extending between another segment and the second edge. The grooves define first and second groove "sets." Each groove in at least the first set includes a segment angular to the direction of rotation whereby lubricant is distributed both circumferentially and axially on the surface.

More specifically and in one exemplary embodiment, the bearing is generally cylindrical, has first and second edges and a flange or lip extending radially outward from the second edge. Each segment in the first set of grooves connects to a first exit runner extending between the segment and the first edge. This arrangement permits lubricant to also be distributed to the first edge as well as along the surface.

Each groove in the second set also includes a segment angular to the direction of rotation. Each of such segments in the second set connects to a second exit runner extending between the segment and the second edge so that lubricant is also distributed to the second edge.

In a highly preferred embodiment, each segment is generally linear as are each of the exit runners. Described another way, each lubrication groove includes a linear, angularly-oriented segment terminated at either end by a linear exit runner with the segments and exit runners being respectively parallel to one another.

As is described in more detail below, the grooves are spaced along the bearing surface. Groove configuration and groove spacing are selected to define axial regions devoid of groove, thereby increasing the area of the surface available to bear the load.

In another embodiment, the grooves are devoid of separately-defined exit runners and the segments in the first set of grooves and the second set of grooves extend to the first edge and to the second edge, respectively, so that lubricant is distributed to both edges.

In the embodiments described above, the bearing is suitable for bi-directional rotation. That is bearing-component relative rotation in either direction will spread lubricant across the surface and along the exit runners to the edges.

In yet another embodiment more suitable for uni-directional rotation, each segment includes intersecting segment legs angular to the direction of rotation. A leg of each segment in the first set connects to a first exit runner extending between the leg and the first edge for lubricant distribution to the first edge. Similarly, a leg of each segment in the second set connects to a second exit runner extending to the second edge so that lubricant is distributed to such second edge.

In yet another embodiment, the legs of each groove segment are devoid of exit runners and terminate short of an edge or the grooves are devoid of separately-defined exit runners and simply extend to the first edge or the second edge.

Further details of the invention are set forth in the following detailed description and the drawing.

BRIEF DESCRIPTION OF THE DRAWING

FIG. 2 is a top plan view, in phantom, of the main housing portion of the dragline of FIG. 1, taken along the viewing plane 2—2 thereof and with parts broken away.

FIG. 12A is a view of a portion of the inner surface, with part broken away, of FIG. 9A shown in conjunction with a vector diagram relevant to operation in one direction of component rotation.

FIG. 12B is an enlarged view of the vector diagram shown in FIG. 12A.

FIG. 12C is an enlarged view of a vector diagram relevant to operation in the other direction of component rotation.

FIG. 13 is a view like that of FIG. 9A, with part broken away, showing a second embodiment of the inventive lubrication groove arrangement.

FIG. 14 is a view like that of FIG. 9A, with part broken away, showing a third embodiment of the inventive lubrication groove arrangement.

DETAILED DESCRIPTION OF PREFERRED EMBODIMENTS

Figure 15:
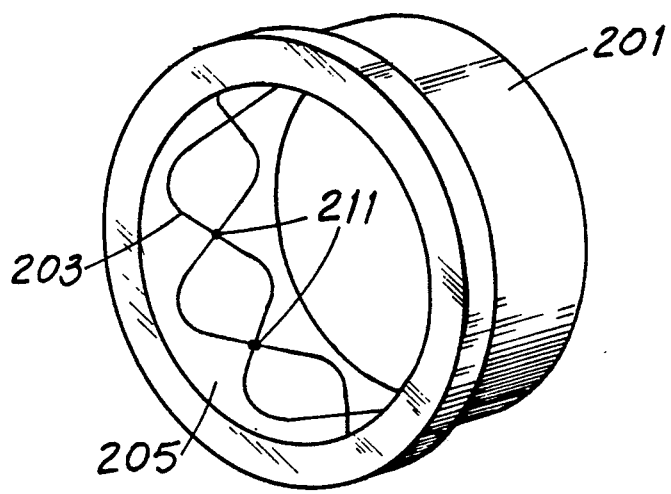
FIG. 15 is an isometric view of a prior art lubrication groove arrangement.

Aspects of the invention will be better appreciated by first understanding how lubrication grooves in earlier bushings are configured. Referring to FIG. 15, the bushing 201 includes plural grooves 203, each of which is continuous about the entire circumference of the interior bearing surface 205. Each groove 203 is shaped somewhat like a sine wave and the grooves 203 are oriented in opposed sine wave relationship. A major disadvantage of the bushing 201 of FIG. 15 is that the groove arrangement leaves large areas starved of lubricant. The bushing 201 and the component supported thereby are subject to unduly-rapid wear.

Figure 16:
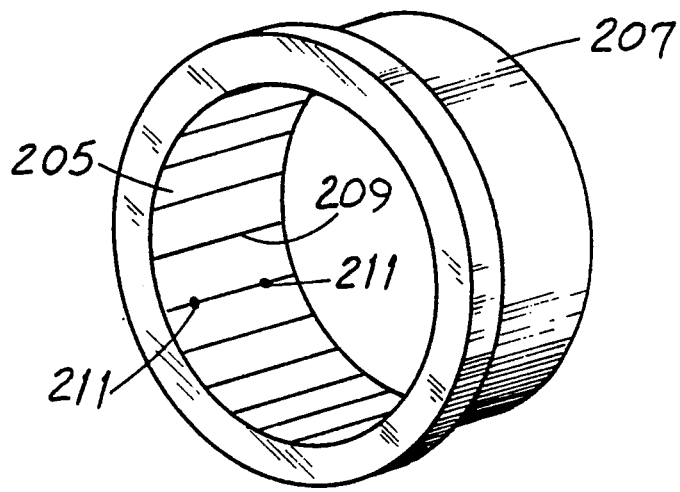
FIG. 16 is an isometric view of another prior art lubrication groove arrangement.

In the bushing 207 of FIG. 16, individual grooves 209 extend axially across the interior surface 205. For reasons that become apparent, such grooves 209 are ineffective in distributing lubricant along the surface 205. In the prior art lubrication grooves 203, 209, pressurized lubricant is introduced into the grooves 203, 209 through small radial ports 211 extending from outside the bearing radially inward to connect to the groove 203, 209. As described below, a somewhat similar technique is used to introduce lubricant into the inventive groove arrangements.

Before describing the preferred embodiments of the invention, it should be appreciated (and persons of ordinary skill will appreciate) that the improved bearing 10 is applicable to stationary mounted "in-factory" machines and to mobile machinery and bushing-type journal bearings which may be used in each. The inventive bearing 10 clearly offers benefits in machines of smaller and moderate sizes and its advantages become more compelling as the size of the machine increases. To help dramatize and emphasize this fact, the invention is disclosed in connection with one of the largest types of machines in the world, a walking dragline 11.

Figure 1:
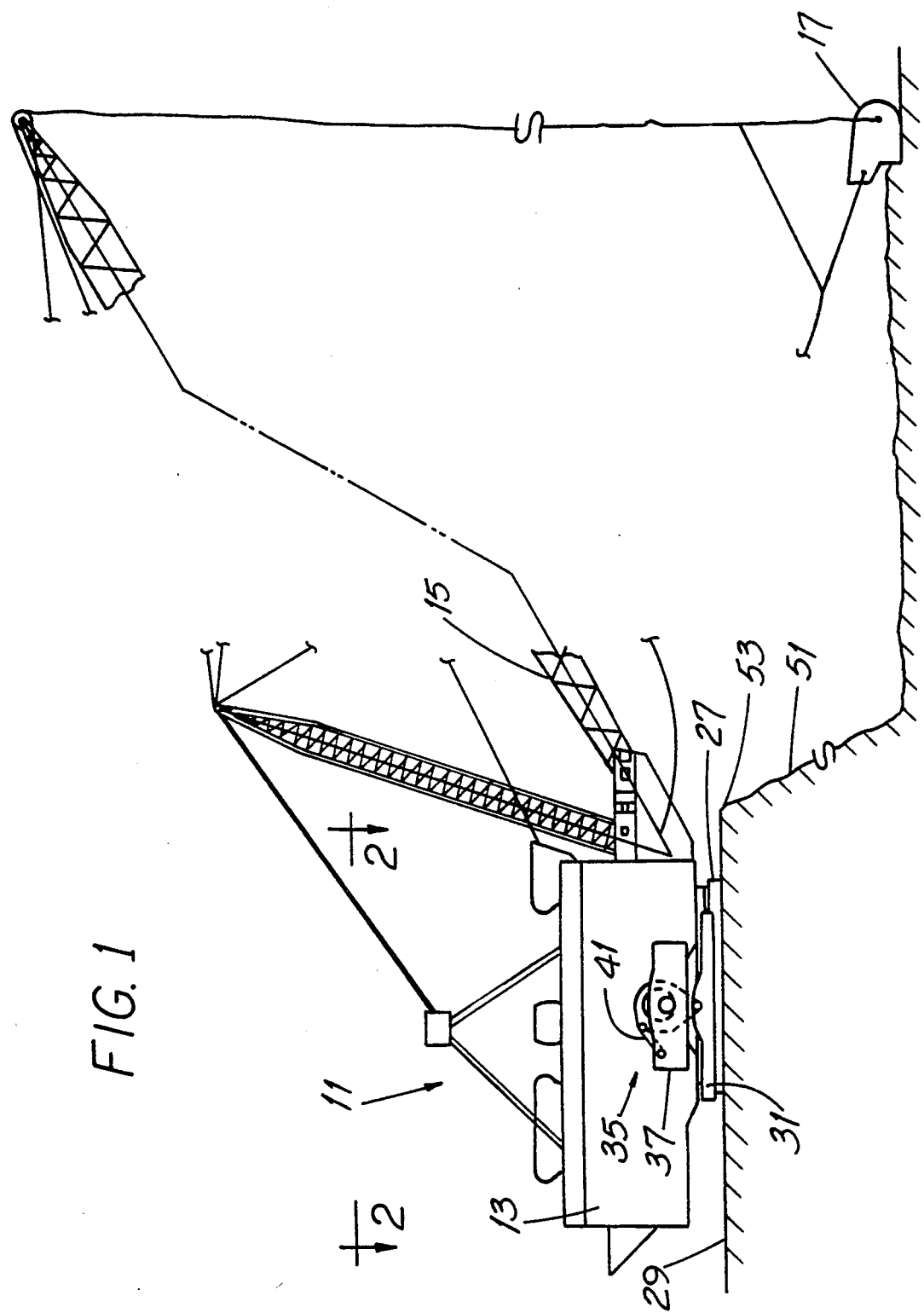
FIG. 1 is a representative side elevation view of a walking dragline.
Figures 3A, 3B:
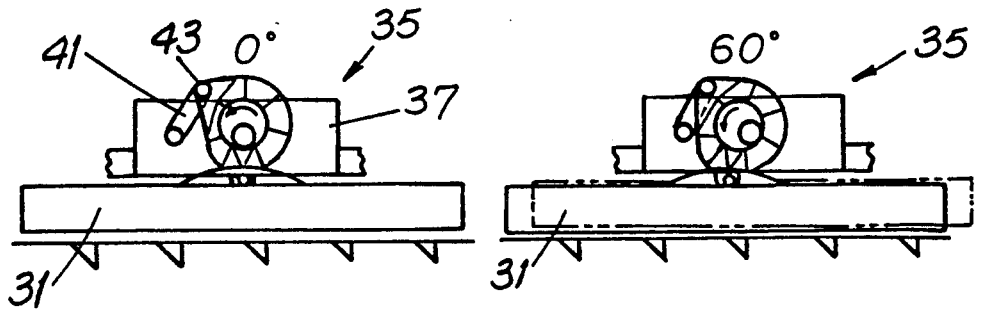
FIGS. 3A-3G show a sequence of operation of one of the walk legs of the dragline of FIG. 1.
Figures 3C, 3D:
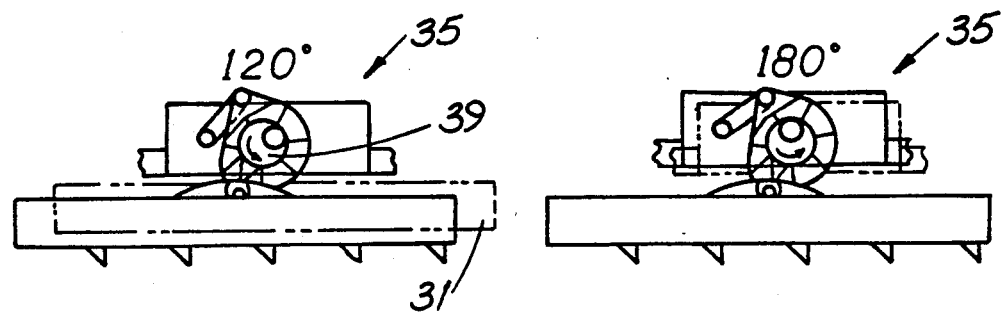
Figures 3E, 3F:
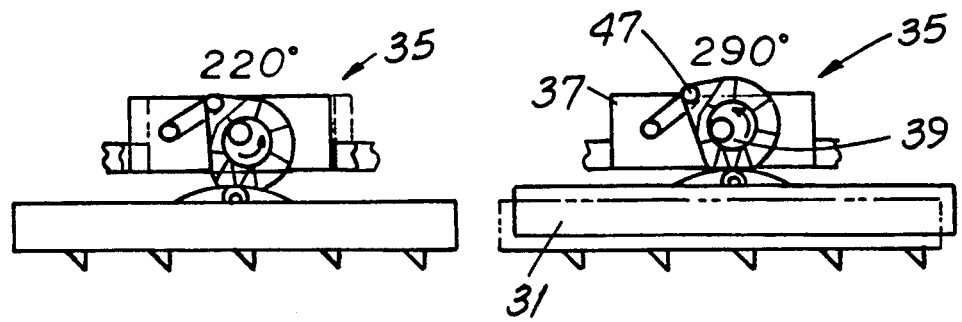
Figure 3G:
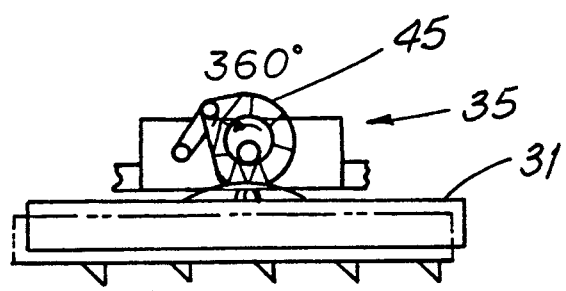

Referring first to FIGS. 1 and 2, an exemplary walking dragline 11 includes a main housing portion 13 having a boom 15 extending therefrom to support and manipulate a digging bucket 17. Within the housing portion 13 are mounted the bucket hoist, bucket drag and swing systems 19, 21 and 23, respectively. The drive 25 for the "walking" system is also mounted therein. When digging, the dragline 11 is supported by and pivots about a generally circular "tub" or platform 27 which rests on the earth's surface 29.

The dragline 11 also includes a pair of pads or "shoes" 31 which, when moved in unison as described below, lift the platform 27 from the surface 29 and move the dragline 11 rearward away from the bucket 17. Movement in the exemplary dragline 11 is in steps of about seven feet in length and along the long axis 33 of the main housing portion 13.

Figure 4:
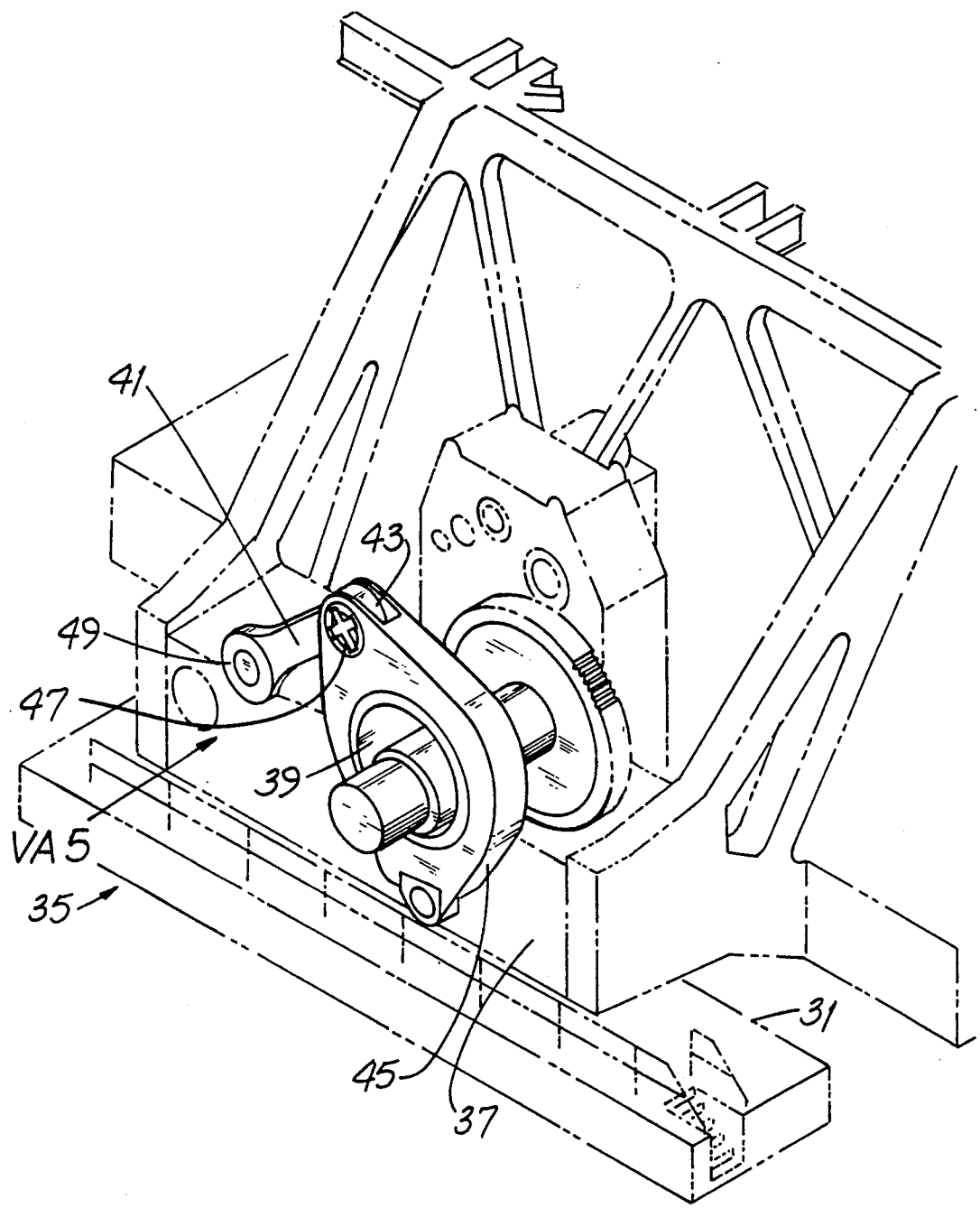
FIG. 4 is an isometric view of the dragline walk leg shown with related supporting structure.
Figure 5:
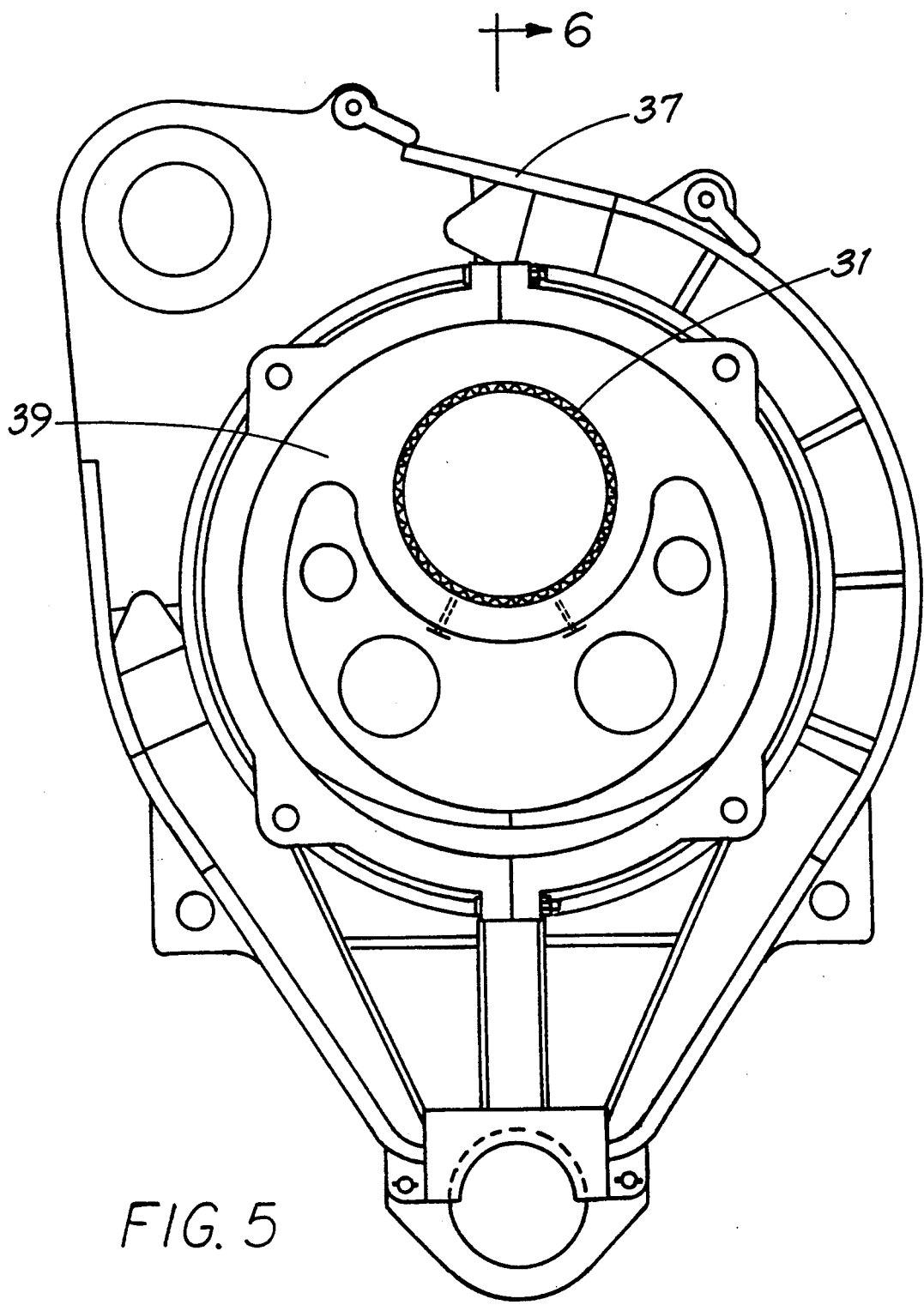
FIG. 5 is a side elevation view of the right-side walk leg assembly of the dragline of FIGS. 1 and 3A-3G.
Figure 6:
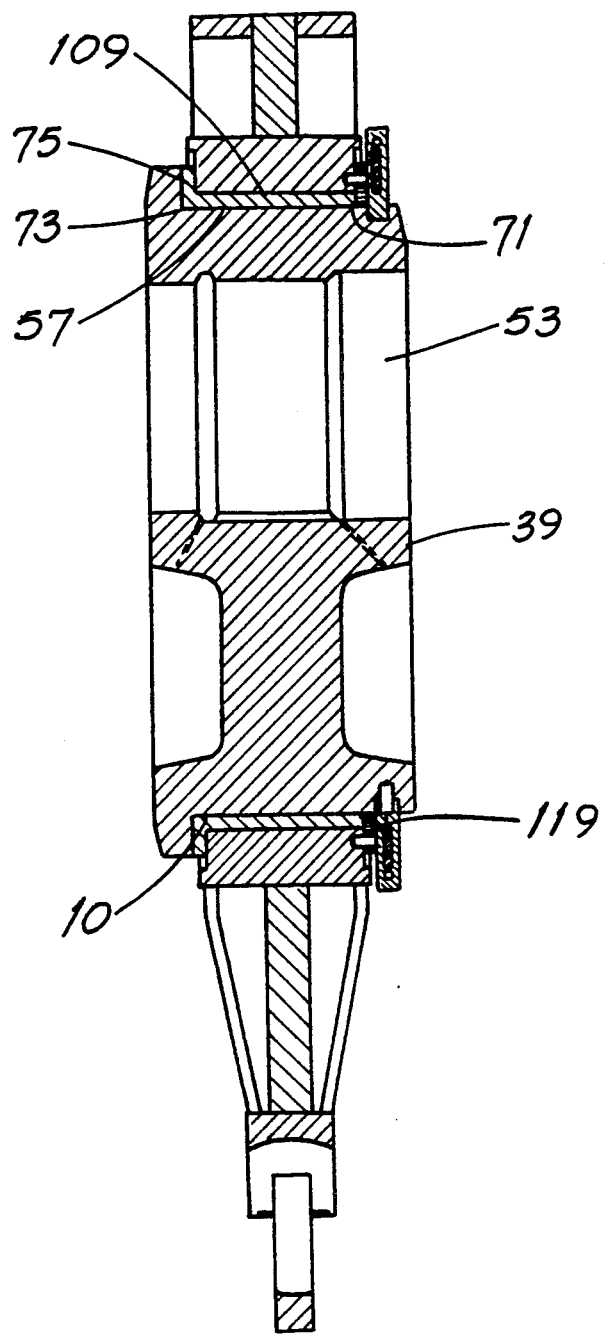
FIG. 6 is a cross-sectional view of the assembly of FIG. 5 taken along the viewing plane 6—6 thereof.

Referring additionally to FIGS. 3A-3G and FIG. 4, a walk-like 35 mechanism typically includes a walk leg housing, a driven eccentric 39 and a knee link 41. The knee link 41 has its upper end 43 coupled to the walk leg housing 45 by a pin 47 to permit relative rotation of a few degrees between the link 41 and the housing 45. The lower end 49 of the knee link 41 is similarly coupled to the nearby main housing structure 37. As a rough analogy, the coupling at the upper end 43 of the link 41 is analogous to the human knee and the eccentric 39 is analogous to the human hip joint. In FIG. 4, numeral 39 denotes the general location of the eccentric and FIG. 5 shows the eccentric 39.

Since the bucket 17 is drawn toward the dragline 11, removal of overburden progresses toward the dragline until the edge of the pit becomes relatively near to the dragline. Therefore, the dragline must occasionally be moved rearward a few feet to expose additional overburden for digging.

Dragline "walking" movement is by driving the eccentric 39 through one revolution at a speed of about 1 rpm or less. As the eccentric 39 is driven counterclockwise (in the right-side sequence of FIGS. 3A-3G) through one revolution, the shoe 31 is lowered to ground contact and the dragline 11 lifted and moved rearward. The shoe 31 is then raised until the platform 27 again rests on the surface 29.

Detailed aspects of the inventive bearing 10 will now be described with respect to FIGS. 5, 6, 7 and 9A. The eccentric 39 is mounted in the bearing 10 with closely fitted sliding clearance. In this specific embodiment, the eccentric 39 is driven by a splined shaft 51 inserted through the opening 53. And, of course, as a general principle of application of the invention, the eccentric 39 can be replaced by a conventional shaft or other shaft-like component. In the specific arrangement shown in FIGS. 5-7, the bearing 10 has unique lubrication grooves 55 formed on the inner cylindrical surface 57 of the bearing 10. Sliding friction occurs between the outer perimeter of the eccentric 39 (which rotates) and the inner surface 57 of the bearing 10 which does not rotate. However, those of ordinary skill will recognize that the inventive groove arrangement can be used on the outer surface 59 of a bearing 10 or on both the inner and outer surfaces 57, 59.

The plurality of grooves 55 define first and second groove sets with grooves 55 in the first set identified as grooves 55a and those in the second set as grooves 55b. In general, those grooves 55a in the first set have runners 60 extending to the first or near side edge 61 of the bearing 10 while those grooves 55b in the second set have runners 60 extending to the far side or second edge 63 of the bearing 10. And there are other grooves 55c in which the runners 60 do not extend to either edge 61, 63.

Figure 7:
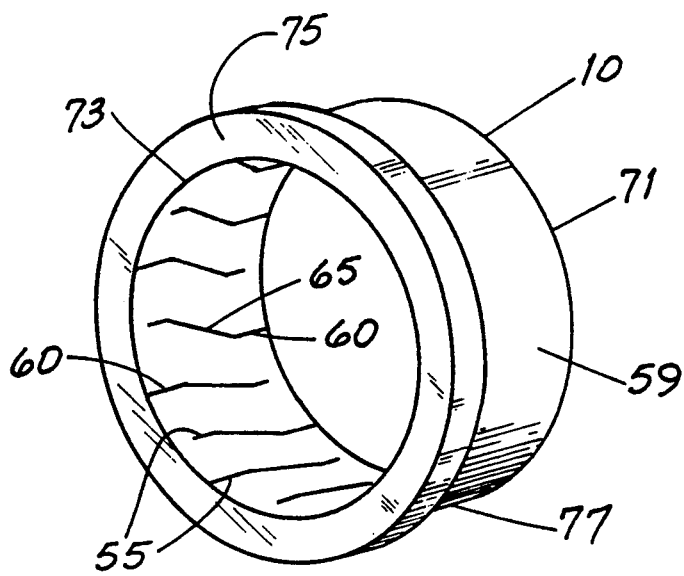
FIG. 7 is an isometric view of a bushing-type plain journal bearing incorporation a highly preferred embodiment of the lubrication groove arrangement.
Figure 9:
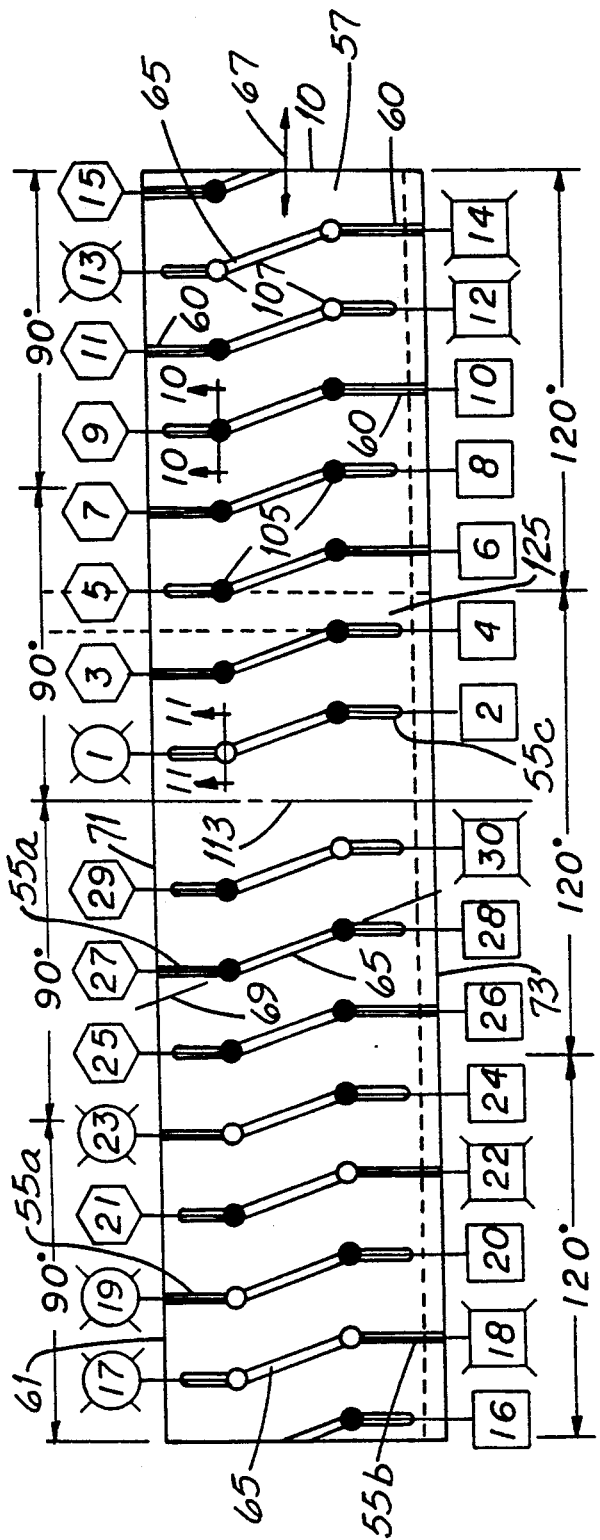
FIG. 9A is a "laid out" view of the 360° circumferential inner surface of the bearing of FIG. 8.
FIG. 9B is a coding table relating to FIGS. 8 and 9A.

Each groove 55a in at least the first set (and preferably in both sets) includes a segment 65 positioned between the edges 61, 63 and angular to the direction of rotation 67 of the eccentric 39. While the eccentric 39 is normally driven in only one direction, it is possible to drive it in the opposite direction and the bearing 10 of FIGS. 7 and 9A is suitable for bi-directional rotation. In the depiction of FIG. 9A, each segment 65 is coincident with a plane like plane 69. The reason for such segment orientation is described below.

Figure 8:
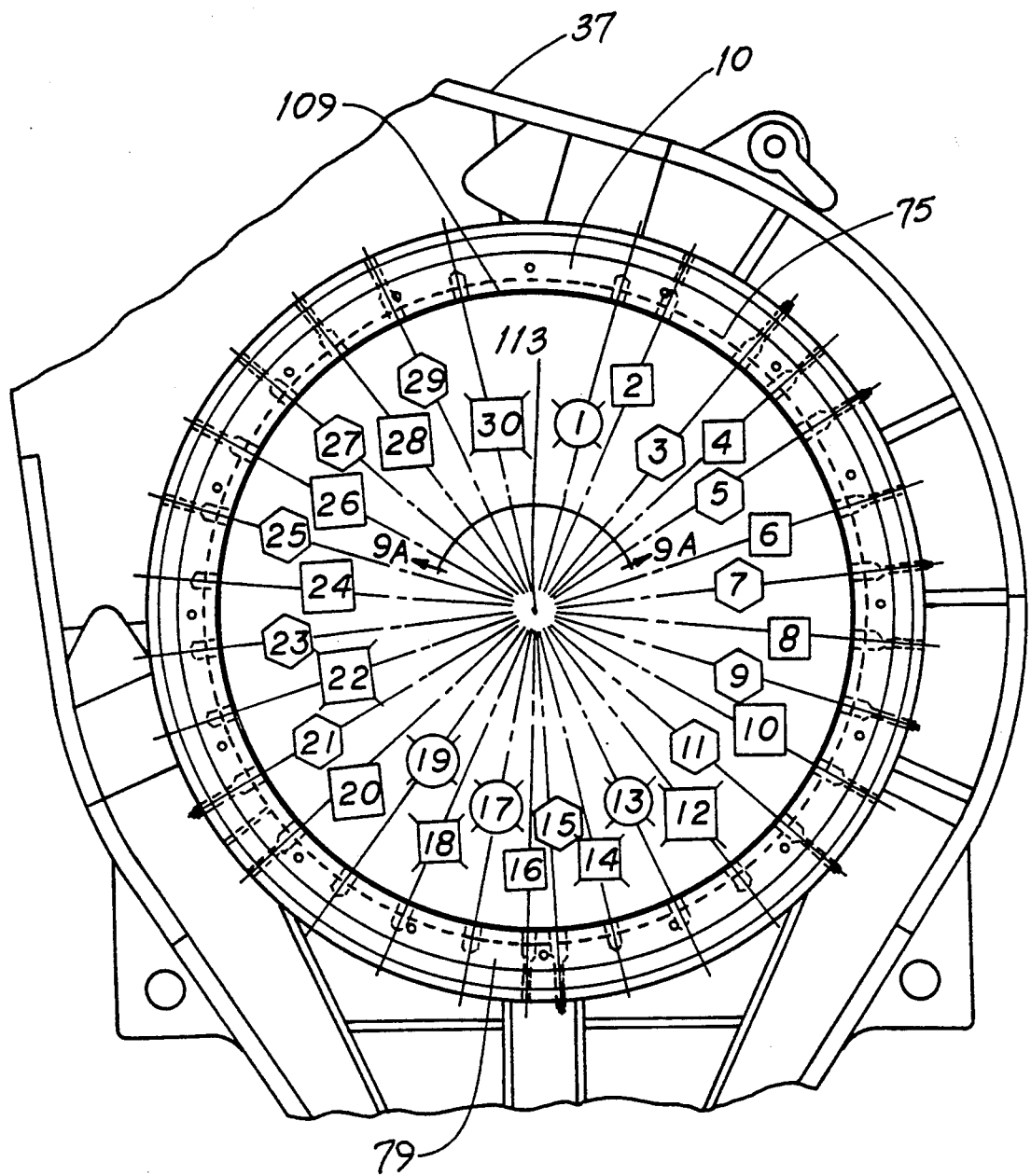
FIG. 8 is a side elevation view like that of FIG. 5 showing the bearing in phantom with certain "coding" as shown in FIGS. 9A and 9B. Parts are broken away.

Referring additionally to FIGS. 8 and 9B, the bearing 10 has a first edge 71 and a second flanged edge 73, the latter having a flange 75 extending radially outward from the bearing body 77. In the views of FIGS. 5 and 8, the flange 75 is on the side of the housing 45 away from the viewer and is therefore shown in dashed outline. A more detailed explanation of FIG. 9A will help understand aspects of the invention. FIG. 9A depicts the inner surface 57 of the bearing 10 as if the bearing 10 had been slit axially ("inward/outward" in FIG. 8) at the bearing bottom portion 79 and laid out flat with its flanged edge 73 downward and its inner surface 57 toward the viewer. If one were to replicate the bearing inner surface 57 in a paper model, the depiction of FIG. 9A would be cut out and the left and right ends of the resulting paper strip drawn upward and inward toward one another and joined.

Additionally, the first edge 61 is referred to herein as the "near side" edge of the bearing 10 since it is the edge 61 nearest the viewer in FIGS. 5 and 8. Similarly, the second flanged edge 73 is designated as the far side edge 63 and such designations are primarily for purposes of explaining groove configuration and orientation and how lubricant is introduced into certain of the grooves 55.

A "coding" system has been developed and will also help understand the specific embodiment of the invention shown in FIGS. 8, 9A and 9B. Referring to FIG. 9B, four symbols include a hexagon 81, a "legged" circle 83, a square 85 and a "legged" square 87. These symbols 81, 83, 85, 87 relate to symbols 81, 83, 85, 87 shown in FIG. 9A and denote, as to the near side 61 and the far side 63 of the bearing 10, the location of coaxial lubrication stems 89 and dowels 91 and the location of dowels 91 alone. Each symbol 81, 83, 85, 87 also has a position-identifying numeral which "key" FIGS. 8 and 9A together.

Figure 10:
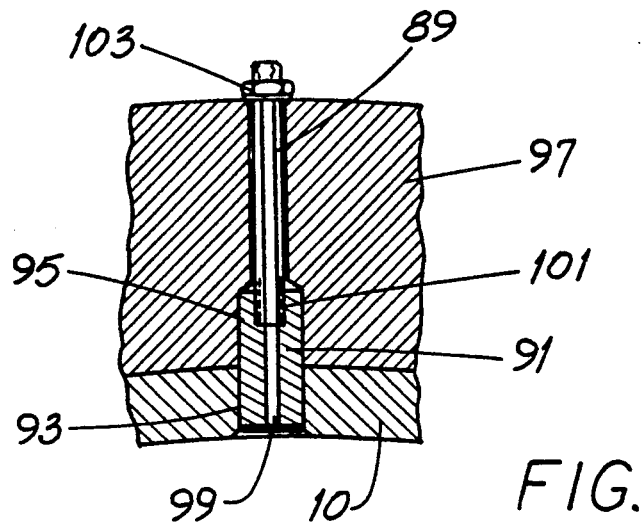
FIG. 10 is a cross-section view taken along the viewing plane 10—10 of FIG. 9A, with parts broken away, and showing a dowel and lubrication stem.
Figure 11:
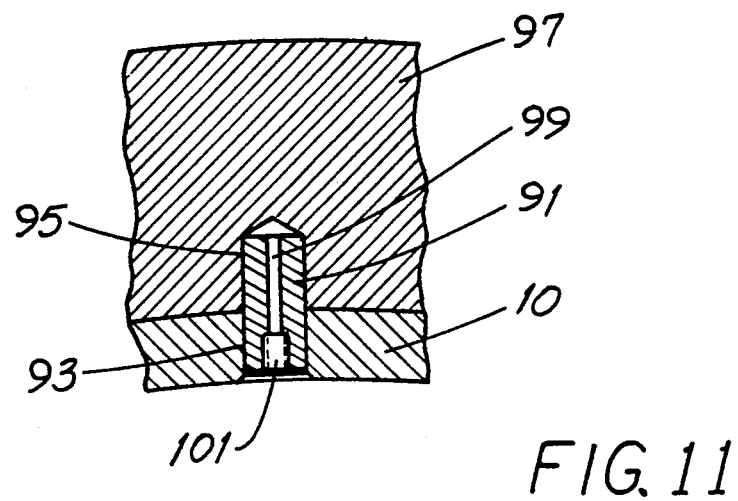
FIG. 11 is a cross-section view taken along the viewing plane 11—11 of FIG. 9A, with parts broken away, and showing a dowel.

Referring additionally to FIGS. 10 and 11 (mention of which appears in FIG. 9B), the bearing 10 has a plurality of radially-formed holes 93 formed in it. A dowel 91 is inserted in each hole 93 and because of dowel engagement with a hole 95 in the retainer 97, the bearing 10 is prevented from rotating within such retainer 97. Each dowel 91 has a through-passage 99 and one dowel end includes a threaded cavity 101. As shown in FIG. 10, a lubricating stem 89 is attached to certain dowels 91, i.e., those associated with the hexagon and square coding symbols 81, 85. Lubricant is introduced through the stem 89 and the passage 99 to a particular groove 55. And when the bearing 10 needs to be replaced, the nut 103 is removed and the stem 89 tapped to drive the dowel 91 out, i.e., downward as shown in FIG. 10.

In the arrangement shown in FIG. 11, the dowel 9 is oriented so that its threaded cavity 101 is adjacent to the bearing 10 rather than to the retainer 97. In this arrangement, the dowel 91 is pulled by threading the stem 89 of a conventional slide hammer into the cavity 101.

Referring again to FIGS. 8, 9A and 9B, the locations of dowels 91 and lubrication stems 89 are represented by blackened circles 105 while the locations of dowels 91 alone are represented by white circles 107. Considering the symbols 81, 83, 85, 87 of each groove 55, it will be apparent that a groove 55 identified by a legged circle symbol 83 and a legged square symbol 87 has dowel openings and dowels 91 but no lubrication stem 89 communicating therewith since the legged circle and legged square symbols 83, 87 associated therewith both refer to FIG. 11 which illustrates a "blind" dowel 91 rather than a dowel 91 with a lubricating stem 89 attached. A groove 55 identified by a hex symbol 81 and a legged square symbol 87 has a single lubrication stem 89 communicating therewith at the near side 61 and a single blind dowel 91 at the far side 63 since the hexagon symbol 81 "codes" to FIG. 10 and the legged square symbol 87 codes to FIG. 11. Another groove 55 has two lubrication stems 89 communicating therewith as denoted by the hexagon symbol 81 and the square symbol 85.

Certain observations can now be made and principles stated regarding the first embodiment of the groove arrangement. In the grooves 55 described above, the dowels 91 or dowels 91 and lubrication stems 89 (as the case may be) are located at the junction of a segment 65 and an exit runner 60. In a bearing 10 used in a walking dragline 11, the shoe 31 "hangs" suspended above ground when not in use and the weight of the shoe 31 is borne by the bearing top portion 109. The bearing 10 and eccentric 39 are machined so there is slight clearance between them. Because of the weight of the shoe 31, such clearance will appear at the bearing bottom portion 79 when the mechanism 35 is installed but idle.

On the other hand, during walking, the weight of the entire machine is borne by the bearing bottom portion 79. Therefore, for dragline service, the bottom portion 79 of the bearing 10 would normally have more lubrication points such as those identified by the hexagon and square symbols 81 and 85. In the specific exemplary application, access to such bottom portion 79 is very limited and, as a consequence, there are fewer lubrication stems 89 at such portion 79.

Referring next to FIG. 13, a second embodiment of the improved lubrication groove arrangement also includes first and second groove sets comprised, respectively, of grooves like the groove 55a and of grooves like the groove 55b. Such sets are defined as described above and there are other grooves like groove 55c in which the runners 60 do not extend to either edge 61, 63. Each segment 65 includes intersecting segment legs 65a angular to the direction of rotation. A leg 65a of each of segment 65 in the first set connects to a first exit runner 60 extending between the leg 65a and the first edge 61. Similarly, a leg 65a of each segment 65 in the second set connects to a second exit runner 60 extending to the second edge 63 so that lubricant is distributed to both edges 61, 63. As with the highly preferred embodiment, each exit runner 60 is generally linear.

In the arrangement of FIG. 14, the first and second groove sets include grooves 55a and grooves 55b, respectively. In the version of FIG. 14, there are no separately-defined exit runners; the legs 65a are extended and function as exit runners 60.

The operation of the bearing 10 and the inventive groove arrangements will now be described. In so doing, it is assumed that lubricant has been introduced into certain of the grooves 55 through lubrication stems 89 at locations consistent with the described symbols. In FIG. 12A, the direction of rotation (which may be in either of two directions) is represented by the arrow 111. The axis 113 represents the center axis of the bearing 10. As the outer surface of the eccentric 39 slides across the inner surface 57 of the bearing 10, the eccentrics 39 acts upon the lubricant in the following way.

In this part of the explanation, it will be helpful to refer to FIGS. 12A–12C and consider a tiny "particle" of lubricant 115 acted upon by the sliding action of the eccentric 39. Assuming the eccentric 39 is rotating and, in effect, sliding leftward across the inner surface 57 (leftward in the views of FIGS. 9A, 12A and 12B), a force acts on the particle and this force is represented by the arrow 117. Using graphic vector analysis, this arrow 117 can be "resolved" into the arrow 117a which tends to urge the particle along the groove 55 and the arrow 117b which tends to move the particle 115 out of the groove 55 and onto the bearing surface 57. In the diagram of FIG. 12C, the eccentric 39 is assumed to be sliding rightward across the inner surface 57 and the arrows 117, 117a, 117b are correspondingly numbered. Persons familiar with static force analysis (usually a first year engineering course) will recognize the analytical approach described above and shown in FIGS. 12A–12C.

Since the segments 65 connect to exit runners 60, lubricant is distributed not only across the surface 57 but also to the edges 61, 63 so that wear particles, dirt and the like may be flushed away from the bearing 10 and so that the thrust washer 119 (FIG. 6) and the flange 75 may be lubricated.

Referring to FIGS. 9A and 12A–12C and the discussion related thereto, it is apparent that in the lubrication groove arrangements of FIGS. 13 and 14, the bearing 10 is suitable for use with a component rotating in one direction, i.e., sliding across the bearing inner surface 57 in the direction of the arrow 121. This is so since only rotation in that direction will urge lubricant put into the grooves 55 at the points 123 to be urged along the grooves 55 toward one or both of the edges 61, 63 and out of the grooves 55 onto the surface 57.

Of course, the presence of a groove 55, while desirable for the introduction of lubricant, detracts from the overall area of the surface 57 available to bear load. In the embodiments of FIGS. 9A, 13 and 14, there are axial regions 125 on the inner surface 57 along which no groove 55 is formed. This preferred arrangement maximizes the surface area available for load bearing while yet providing sufficient groove "density" to lubricate the surface 57 and the edges and flush wear particles.

It should be appreciated that the arrangement of FIG. 9A is selected in view of the fact that in a walk mechanism 35 of a walking dragline 11, the bearing 10 is loaded most heavily over only about 120° of its surface 57. Further, the walk mechanism 35 is constructed in a way that one cannot gain access to portions of the bearing perimeter for placing lubrication stems 89. In an application where access is not so limited and where bearing loading is generally uniform, lubrication stems 89 would be placed relatively evenly-spaced about the bearing.

It is also to be appreciated that in the specific exemplary embodiment, the bearing 10 is oriented upright, i.e., with its center axis 113 generally horizontal. For a bearing 10 mounted with its axis 113 vertical and used for uni-directional operation, only the upper lubrication points (those nearer the upper edge of the bearing 10) are needed. And exit runners 60 would be formed only at the lower edge of the bearing 10 since gravity will draw lubricant down through such runners 60.

While the principles of this invention have been described in connection with specific embodiments and with a specific exemplary application, i.e., a walking dragline, it should be understood clearly that these descriptions are made only by way of example and are not intended to limit the scope of the invention.

I claim:

1. In a machine having a bushing-type boundary lubricated journal bearing with (a) a first edge, (b) a second edge, and (c) a lubricated surface, the machine also having a rotating component in contact with the bearing, the improvement comprising:
   a plurality of lubrication grooves spaced along the surface and defining first and second groove sets;
   each of plural grooves in the first set includes (a) an exit runner portion extending only to the first edge, (b) a groove end spaced from the second edge, and (c) a segment angular to the direction of rotation;
   each of plural grooves in the second set includes an exit runner portion extending only to the second edge and further includes a groove end spaced from the first edge;
   and wherein:
   the exit runner portion of each of plural grooves in the first set of grooves is substantially normal to the direction of rotation.

2. The improvement of claim 1 wherein:
   each of plural grooves in the second set of grooves includes a segment angular to the direction of rotation; and,
   the exit runner portion of each of plural grooves in the second set of grooves is substantially normal to the direction of rotation.

* * * * *